US009167382B2

(12) United States Patent
Arvidsson

(10) Patent No.: US 9,167,382 B2
(45) Date of Patent: Oct. 20, 2015

(54) METHOD AND SYSTEM FOR WIRELESS COMMUNICATION

(71) Applicant: Interlite Aktiebolag, Uddevalla (SE)

(72) Inventor: Niclas Arvidsson, Uddevalla (SE)

(73) Assignee: INTERLITE AKTIEBOLAG, Uddevalla (SE)

( * ) Notice: Subject to any disclaimer, the term of this patent is extended or adjusted under 35 U.S.C. 154(b) by 110 days.

(21) Appl. No.: 14/202,787

(22) Filed: Mar. 10, 2014

(65) Prior Publication Data

US 2015/0256971 A1    Sep. 10, 2015

(51) Int. Cl.
*H04L 27/00* (2006.01)
*H04W 4/02* (2009.01)
*H04L 29/08* (2006.01)
*H04W 84/12* (2009.01)

(52) U.S. Cl.
CPC ............... *H04W 4/021* (2013.01); *H04L 67/12* (2013.01); *H04W 84/12* (2013.01)

(58) Field of Classification Search
CPC ..... H04W 4/021; H04W 84/12; H04W 74/04; H04W 84/18; H04W 28/10; H04L 67/12; G08C 17/20; G08C 2201/40; G08C 2201/50; G08J 13/00; G08B 1/715; G08B 7/2621
USPC ......... 370/330–467; 375/131, 259; 455/452.1
See application file for complete search history.

(56) References Cited

U.S. PATENT DOCUMENTS

| | | | | |
|---|---|---|---|---|
| 5,926,501 A * | 7/1999 | Souissi | ..................... | H04B 1/69 375/131 |
| 6,400,751 B1 * | 6/2002 | Rodgers | .................. | H04B 1/715 375/132 |
| 6,415,439 B1 * | 7/2002 | Randell | .................... | H04L 67/12 348/61 |
| 6,519,460 B1 * | 2/2003 | Haartsen | ................. | H04B 1/715 370/330 |
| 8,149,788 B1 * | 4/2012 | Vargantwar | ....... | H04W 36/0083 370/331 |
| 8,989,961 B2 * | 3/2015 | Chien | ..................... | G06F 17/00 455/418 |
| 2005/0232305 A1 * | 10/2005 | Lindemann | ............. | H04L 69/18 370/489 |
| 2005/0286646 A1 * | 12/2005 | Fails | ...................... | G08C 17/02 375/259 |
| 2012/0094684 A1 * | 4/2012 | Reddy | ................... | H04W 4/025 455/456.1 |
| 2013/0150027 A1 * | 6/2013 | Leclercq | ............... | H04W 4/021 455/427 |
| 2013/0189941 A1 * | 7/2013 | Abbott | .................. | H04W 4/021 455/404.1 |
| 2014/0066064 A1 * | 3/2014 | Huang | .................. | H04W 4/021 455/435.1 |

* cited by examiner

*Primary Examiner* — Afsar M Qureshi
(74) *Attorney, Agent, or Firm* — Remarck Law Group PLC

(57) ABSTRACT

The present disclosure relates to a method for facilitating wireless communication. In particular, the present disclosure relates to a method for multiband communication based on communication criteria's set by the specific wireless environment and the geographical location where the wireless communication is to be performed. The disclosure also relates to a corresponding wireless communication device and to a wireless communication system comprising such a wireless communication device. Still further, the disclosure relates to a corresponding computer program product.

17 Claims, 3 Drawing Sheets

METHOD AND SYSTEM FOR WIRELESS COMMUNICATION

TECHNICAL FIELD

The present disclosure relates to a method for facilitating wireless communication. In particular, the present disclosure relates to a method for multiband communication based on communication criteria's set by the specific wireless environment and the geographical location where the wireless communication is to be performed. The disclosure also relates to a corresponding wireless communication device and to a wireless communication system comprising such a wireless communication device. Still further, the disclosure relates to a corresponding computer program product.

BACKGROUND

With the rapid development of new luminaires based on new emission technologies an increased number of control options become available within the entertainment, architectural, commercial, industrial, street and event industries. For controlling the different devices used, by means of e.g. digital control signals according to a predefined protocol, a mixture of wired and wireless technologies may be used, with a trend to move towards the sole use of wireless transmission technologies focusing mainly on transmission within the 900 MHz and 2.4 GHz frequency bands.

Generally, wireless communication systems comprises on one side a wireless transmitter module connected to a control device and on the other side one or a plurality of wireless receivers modules each connected to independently controllable devices, for example selected from the above mentioned luminaires, for allowing unidirectional transmission of control signals. Depending on the predefined protocol, both sides may instead (or also in a mixed manner) be equipped with wireless transceivers for allowing bi-directional transmission of control signals between the control device and the controllable device(s). Such a wireless communication system for the entertainment, architectural, commercial, industrial, street and event industries is well known by the skilled addressee, and is for example disclosed in US 2005/286646.

Even though the wireless communication systems disclosed in US 2005/286646 provides a possibility to move towards wireless control of e.g. luminaires and similar devices within the entertainment, architectural, commercial, industrial, street and event industries, they fails to provide solutions to the increasingly complex problem of crowded wireless transmission space is such specific environments, taking into account the further complexity with using the wireless communication systems in different geographical locations. Thus, there is a need for a more reliable wireless transmission method, specifically for providing increased reliability in relation to e.g. stage automation, industrial lighting, office lighting and home automation.

SUMMARY

According to an aspect of the disclosure, the above is at least partly met by a method configured to adapt a wireless communication protocol used by a wireless communication device configured for wireless control within at least one of the entertainment, architectural, commercial, industrial, street and event industries, the wireless communication device being configured for wireless communication within a radio spectrum comprising frequency bands within the 5 GHz range.

The method comprises determining a geographical location for performing the wireless communication, determining a first set of pre-regulated communication limitations relating to the radio spectrum within the 5 GHz range at the determined geographical location, receiving a second set of communication limitations being specific for the at least one of the entertainment, architectural, commercial, industrial, street and event industries, correlating the first set of communication limitations with the second set of communication limitations resulting in a third set of communication limitation, and adapting the wireless communication protocol of the wireless communication device to correspond to the limitations set by the third set of communication limitations.

The general concept of the present disclosure is based on the fact that it may be possible to increase the usability of a wireless communication device configured for wireless control within at least one of the entertainment, architectural, commercial, industrial, street and event industries when the wireless device is used at different geographical locations. The concept takes into account specific communication limitations present within the wireless communication environment present in relation to the entertainment, architectural, commercial, industrial, street and event industries, and correlates these limitations with "local" communication limitations relating to communication within the 5 GHz radio frequency spectrum. The end result of this correlation gives the possibility for an adaptation of the wireless communication protocol used by the wireless communication device, allowing for a simplified set-up for a user handling for example a wireless communication system comprising a plurality of such wireless communication devices and to secure that the wireless communication fully stayed within the limitations set by the current environment and location for communication.

In some embodiments, the process of adapting the communication protocol is automated with only limited user input. In one possible scenario where the disclosure is used, a computer processing device have access to the first as well as the second set of communication limitation, and a user operating the processing device activates the correlation of the sets of communication limitations. Possibly, the activation may comprise the user providing input (possibly using a user interface, such as a button, a GUI in a configuration software, etc.) relating to the current location for operating the wireless communication device. Alternatively and within the scope of the disclosure, the processing device automatically acquires information as to the current location, for example using information from a GPS or using wireless communication based positioning (possibly comparable to Wi-Fi-based positioning). Based on the current location, a corresponding set of communication limitations for that specific location is acquired (typically pre-stored and accessible by the processing device and generally differing between countries, specifically in relation to wireless communication within the 5 GHz radio frequency spectrum). In addition, the processing device is configured to acquire knowledge relating to the specific requirements for wireless control set by least one of the entertainment, architectural, commercial, industrial, street and event industries. Using this dual knowledge, a correlated set of communication limitations are determined and applied for adapting the wireless communication protocol to be used by the wireless communication device.

A direct advantage stemming from the above is that a user will be able to quickly set-up a wireless communication system in case of for example moving the wireless equipment between different countries. In addition, in manufacturing the equipment, it may similarly be possible for the manufacturer to pre-set the expected location where the equipment is to be used using e.g. the above discussed user interface or a manufacturing related interface. Thus, the manufacturer may manufacture only a single version of the wireless communication device and easily adapt the device according to the different standards set in different countries. Hence, the adaptation of the wireless communication protocol may be done by/at the wireless communication device (e.g. using a control unit of the communication device) or may be determined using other equipment and provided (e.g. downloaded as a configuration file) to the wireless communication device.

As discussed above, the disclosure takes specifically into account and the in comparison very high reliability demands dictated by at least one of the entertainment, architectural, commercial, industrial, street and event industry environment as compared to "normal" wireless communication (e.g. Wi-Fi) where the "real-time" factor is not as critical. Accordingly, the present disclosure allows for minimization of the latency in transmission of control signals for keeping it low and well defined. Wireless control as defined by the disclosure typically includes control within areas for example including stage and concert lighting, theme-park lighting, cruise ship lighting etc.

Additionally, the wireless communication device may be arranged as a part of a wireless communication system as discussed above, further comprising a plurality of wireless nodes wirelessly connected to the wireless communication device for forming a wireless network. Wireless control typically relates to relaying control signals and data relating to at least one of the DMX512 protocol, the DMX512A protocol, the RDM protocol, the ACN protocol, the ArtNet protocol, the sACN protocol, the KNX protocol, the DALI protocol and the DSI protocol. Additional future protocols for at least one of the entertainment, architectural, commercial, industrial, street and event industry environment are also within the scope of the disclosure.

In an example embodiment of the disclosure, the first set of communication limitations are pre-determined by a governmental body within a country and or region. Such a governmental body may for example in the United States be the Federal Communication Commission (FCC) and in the European Union be the European Communications Office (ECO). Other similar organizations are generally provided in different countries/regions. In generally, these organizations limit the use of different frequencies for unlicensed communication as will be further discussed below in relation to the detailed description of the disclosure.

In an example embodiment of the disclosure, the second set of communication limitations comprises a predefined bandwidth for channels for the wireless control provided by the wireless communication device. The predefined bandwidth is below 5 MHz, and can be between 3-5 MHz. In comparison to other typical applications active within the 5 GHz radio frequency spectrum, such as for example Wi-Fi devices for general wireless communication having channel bandwidth of at least 20 MHz, the very high reliability demands set according to the disclosure requires an increased number of channels for communication for reducing interference between different devices configured to communicate within the common wireless environment. Hence, by allowing for use of an increased number of communication channels, the typical communication speed will decrease while it will be possible to optimize which channels to use for communication thus giving improvements in relation to e.g. interference with co-existing wireless communication devices. A frequency-hopping spread spectrum technique can be applied in relation to the wireless communication protocol applied for wireless communication. This will be further discussed below in relation to the detailed description of the disclosure.

Furthermore, the method can also (or instead) exclude a bandwidth range (may be a plurality of non-adjacent frequency ranges) requiring radar detection with the second set of communication limitations. Such exclusion will reduce the requirements set on the hardware of the wireless communication device as the device need not be specifically adapted for radar detection as otherwise generally required when communication within the 5 GHz radio frequency spectrum. In an embodiment of the disclosure, the bandwidth range requiring radar detection is between 5.250 GHz and 5.725 GHz. Variations may of course be possible and within the scope of the disclosure.

The 5 GHz radio frequency spectrum may, in accordance to the disclosure, be defined as including a frequency range extending from 5.150 GHz to 5.875 GHz. However, future extension to the 5 GHz radio frequency spectrum is possible and within the scope of the disclosure. Variations may of course be possible and within the scope of the disclosure.

In an example embodiment of the disclosure, the wireless communication device is further configured for wireless communication within a radio spectrum comprising frequency bands within the 2.4 GHz range. As such, an even further number of channels may be provided for wireless communication, allowing the wireless communication device to communicate using both the discussed radio frequency spectrum in a parallel.

Accordingly, the first set of communication limitations can further comprise pre-regulated communication limitations relating to the radio spectrum within the 2.4 GHz range. In accordance with the disclosure, the 2.4 GHz range typically includes a frequency range extending from 2.4 GHz to 2.483 GHz. Variations may of course be possible and within the scope of the disclosure.

According to another aspect of the disclosure there is provided a wireless communication device for wireless communication in a wireless communication device configure to provide wireless communication using an adaptable wireless communication protocol configured for wireless control within at least one of the entertainment, architectural, commercial, industrial, street and event industries, wherein the wireless communication device comprises an antenna, a wireless communication module connected to the antenna; and a control unit for controlling the operation of the wireless communication module, wherein the wireless communication device is configured for wireless communication within a radio spectrum comprising frequency bands within the 5 GHz range, the wireless communication device is configured to provide wireless control using at least one of a DMX512 protocol, a DMX512A protocol, a RDM protocol, an ACN protocol, an ArtNet protocol, a sACN protocol, a KNX protocol, a DALI protocol and/or a DSI protocol, and the wireless communication protocol is adapted by determining a geographical location for performing the wireless communication, determining a first set of pre-regulated communication limitations relating to the determined geographical location and the radio spectrum within the 5 GHz range, receiving a second set of communication limitations being specific for the at least one of the entertainment, architectural, commercial, industrial, street and event industries, and correlating the first set of communication limitations with the second set of communication limitations resulting in a third set of communication limitation. This aspect of the disclosure provides similar advantages as discussed above in relation to the previous aspect of the disclosure.

The wireless communication device can be arranged as a wireless transceiver. However, the functionality of the wireless communication device may be included in other similar wireless communication devices.

Still further, according to the disclosure a wireless communication system that employs the method discussed above can be provided. Accordingly, in such an implementation the communication between at least two and potentially a plurality of wireless communication devices takes place using the adapted communication protocol according to the disclosure.

Also, the wireless communication system may be arranged as a wireless mesh network for further improving the communicational capability of the wireless communication system, for example in such a case where one of a plurality of the nodes are not within line of sight in regards to the wireless communication device. In such a case, the nodes of the wireless communication system (i.e. the wireless communication devices) may be adapted to relay control signals from the wireless communication device to the node(s) not within line of sight of the wireless communication device. Additionally, mesh configuration of the wireless network further extends the possible distance between the wireless communication device and nodes of the wireless communication system.

According to a still further aspect of the disclosure there is provided a computer program product comprising a computer readable medium having stored thereon computer program means for controlling a wireless communication device configured to provide wireless communication using an adaptable wireless communication protocol configured for wireless control within at least one of the entertainment, architectural, commercial, industrial, street and event industries, wherein the wireless communication device is configured for wireless communication within a radio spectrum comprising frequency bands within the 5 GHz range, the computer program product comprising code for receiving a geographical location for performing the wireless communication, code for determining a first set of pre-regulated communication limitations relating to the determined geographical location and the radio spectrum within the 5 GHz range, code for receiving a second set of communication limitations being specific for the at least one of the entertainment, architectural, commercial, industrial, street and event industries, code for correlating the first set of communication limitations with the second set of communication limitations resulting in a third set of communication limitation, and code for adapting the wireless communication protocol of the wireless communication device to correspond to the limitations set by the third set of communication limitations.

The computer program product is typically executed using a control unit, such as a control unit that includes a microprocessor or any other type of computing device. Similarly, a software executed by the control unit for operating the wireless communication device may be stored on a computer readable medium, being any type of memory device, including one of a removable nonvolatile random access memory, a hard disk drive, a floppy disk, a CD-ROM, a DVD-ROM, a USB memory, an SD memory card, or a similar computer readable medium known in the art. Accordingly, operation of the wireless communication device may be at least partly automated, implemented as e.g. software, hardware and a combination thereof.

Further features of, and advantages with, the present disclosure will become apparent when studying the appended claims and the following description. The skilled addressee realize that different features of the present disclosure may be combined to create embodiments other than those described in the following, without departing from the scope of the present disclosure.

BRIEF DESCRIPTION OF THE DRAWINGS

The various aspects of the disclosure, including its particular features and advantages, will be readily understood from the following detailed description and the accompanying drawings, in which.

DETAILED DESCRIPTION

Figure 1:
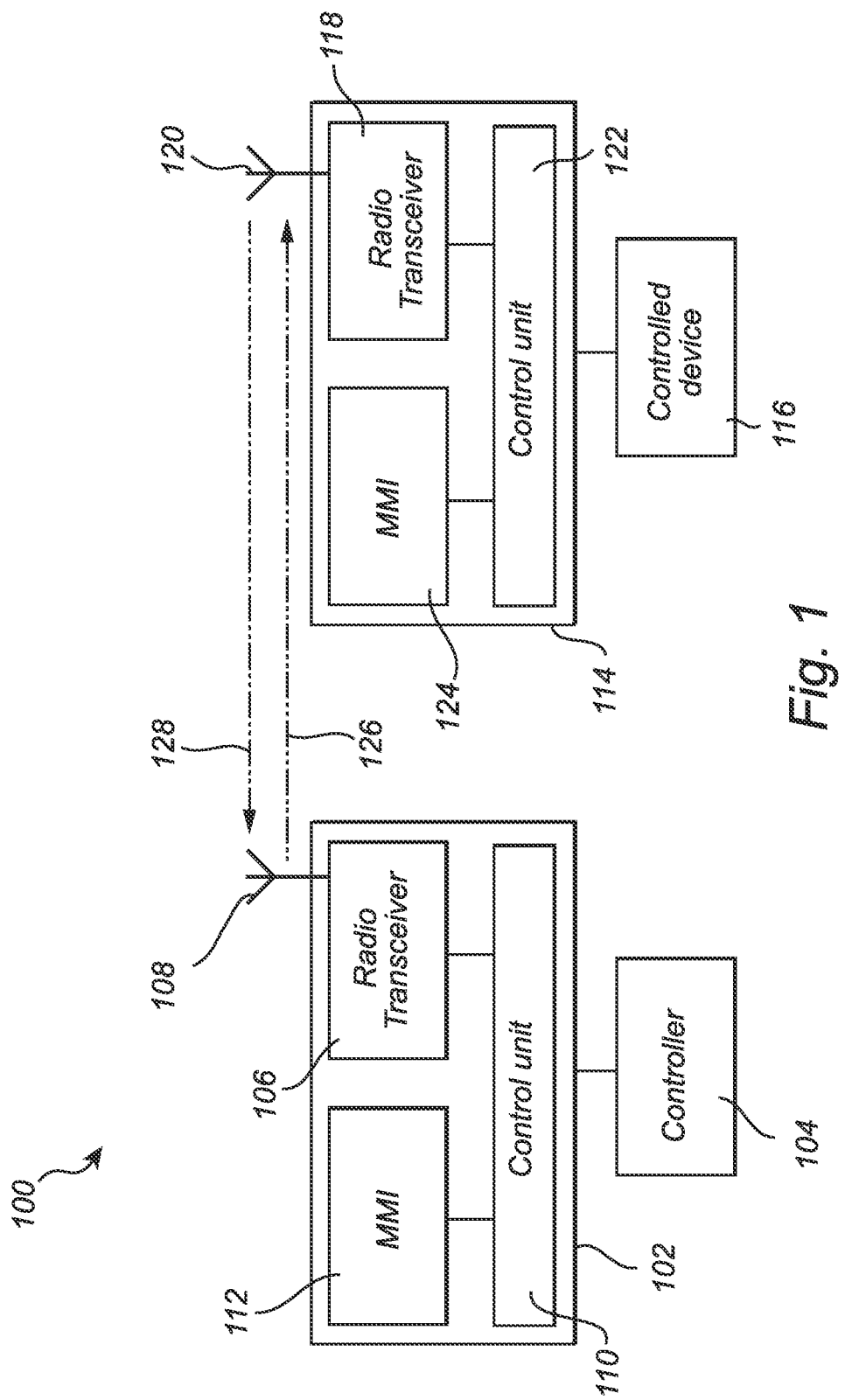
FIG. 1 illustrates a wireless communication system comprising a plurality of wireless communication devices according to a an example embodiment of the disclosure.

The present disclosure will now be described more fully hereinafter with reference to the accompanying drawings, in which example embodiments of the disclosure are shown. This disclosure may, however, be embodied in many different forms and should not be construed as limited to the embodiments set forth herein; rather, these embodiments are provided for thoroughness and completeness, and fully convey the scope of the disclosure to the skilled addressee. Like reference characters refer to like elements throughout.

Referring now to the drawings and FIG. 1 in particular, there is depicted a wireless communication system 100 for use in wireless communication of control signals and data within e.g. the 5 GHZ and the 2.4 GHz frequency band. The wireless communication system 100 comprises a first wireless communication device 102 (forming a "master node") configured to allow wireless communication of control signals and data from (and optionally to) a controller 104. The first wireless communication device 102 comprises a radio transceiver 106, an antenna 108 connected to the radio transceiver 106, a control unit 110 connected to the radio transceiver 106, and a Man Machine Interface (MMI) 112 connected to the control unit 110.

The wireless communication device 100 further comprises a second wireless communication device 114 (forming a "slave node") for providing control signals and data to (and optionally from) a controlled device 116. Similarly to the first wireless communication device 102, the second wireless communication device 114 comprises a radio transceiver 118, an antenna 120 connected to the radio transceiver 118, and a control unit 114 connected to the radio transceiver 118. The second wireless communication device 114 also (optionally) comprises an MMI 124.

The wireless communication system 100 may comprise further nodes (e.g. both master and slave nodes), e.g. wireless communication devices similar to the second wireless communication device 114 each connected to one or a plurality of controlled devices. The slave nodes may also (or instead) be solely adapted to receive control signals and data from a master node, in essence not solely comprising means for receiving wireless signals. The number of nodes in a wireless communication system 100 according to the disclosure may depend on the number of controlled devices that need to be individually controlled. A node may also be adapted to control more than one single controlled device.

The MMI 112 and MMI 124 of the first 102 and the second 114 wireless communication devices may include e.g. display means and light sources for allowing a user to easily monitor at least some basic settings of the wireless communication devices. In some embodiments, the functionality of the first 102 and the second 114 wireless communication devices may be integrated with the controller 104 and the controlled device 116, respectively. In such embodiments the MMI 112 and MMI 124 may be optional. Additionally, the control units 110, 122 may each include a microprocessor, microcontroller, programmable digital signal processor or another programmable device. The control units 110, 122 may also, or instead, each include an application specific integrated circuit, a programmable gate array or programmable array logic, a programmable logic device, or a digital signal processor. Where the control units 110, 122 each includes a programmable device such as the microprocessor, microcontroller or programmable digital signal processor mentioned above, the processor may further include computer executable code that controls operation of the programmable device.

In a wireless communication scenario where the first 102 and the second 114 wireless communication devices forms a wireless network, control signals and data are e.g. initiated from the controller 104 for controlling the controlled device 116. The control signals and data will be processed by the control unit 102. The processed control signals and data will be provided to the radio transceiver 106 for arrangement in a format suitable for wireless e.g. RF transmission. The antenna 108 will transmit RF signals 126 to the antenna 120 of the second wireless communication device 114 for provision to the radio transceiver 118 where they will be processed and provided to the control unit 122. The control unit 122 will in turn provide the processed control signals and data corresponding to the control signals and data initiated by the controller 104 to the controlled device 116.

The controlled device 116 may in turn respond to the information (e.g. control signals and data) provided by the controller 104, or alternatively initiate communication with the master device by its own means, by forming (response) information (e.g. control signals and data transmitted in response or by its own mean) that will be provided to the control unit 122, to the radio transceiver 118, by means of the antenna 120 be transmitted as e.g. RF signals 128 to the antenna 108 of the first wireless communication device 102. The antenna 108 will forward the signals to the radio transceiver 106, to the control unit 110 and back to the controller 104.

In essence, the first 102 and the second 114 wireless communication devices may be said to be transparent to the control signals and data provided from the controller 104 to the controlled device 116, and from the controlled device 116 to the controller 104, essentially forming a wire replacement for communication between the controller 104 and the controlled device 114. The controller 104 may e.g. be a PC having software for generating adequate control signals and data suitable for controlling a controlled device such as e.g. a controllable luminaire used within the entertainment, architectural, commercial, industrial, street and event industries, etc. Other controller and controllable devices are of course possible and within the scope of the disclosure. Examples of controllable devices include e.g. advanced fixtures and special effects devices such as fog machines and moving lights. Depending on the protocol used by the controller and the controllable device, which as noted above will be processed by the respective control units for adaptation to a suitable wireless communication protocol, e.g. IEEE 802.11, may allow for unidirectional (e.g. DMX512, DMX512A) or bi-directional (e.g. RDM, ACN, etc.) transmission of information from the controller to the controllable device and vice versa.

In some embodiments involving bi-directional communication, a wireless communication device in itself may be adapted to respond to information provided by another wireless communication device e.g. connected to a controller. As an example, the controller 104 (or the wireless communication device 102) may initiate a request for the second wireless communication device 114 to respond with its level of reception back to the controller, even within the context of transmission of signals within the RDM protocol. In such a case the second wireless control device 114 is not transparent to signals from the controller 104, but rather provides valuable information back to the controller 104. Also, the controlled device may comprise a plurality of control devices, possibly providing for "injection" of RDM packets without modifying DMX data being transmitted over a DMX line.

Figure 2:
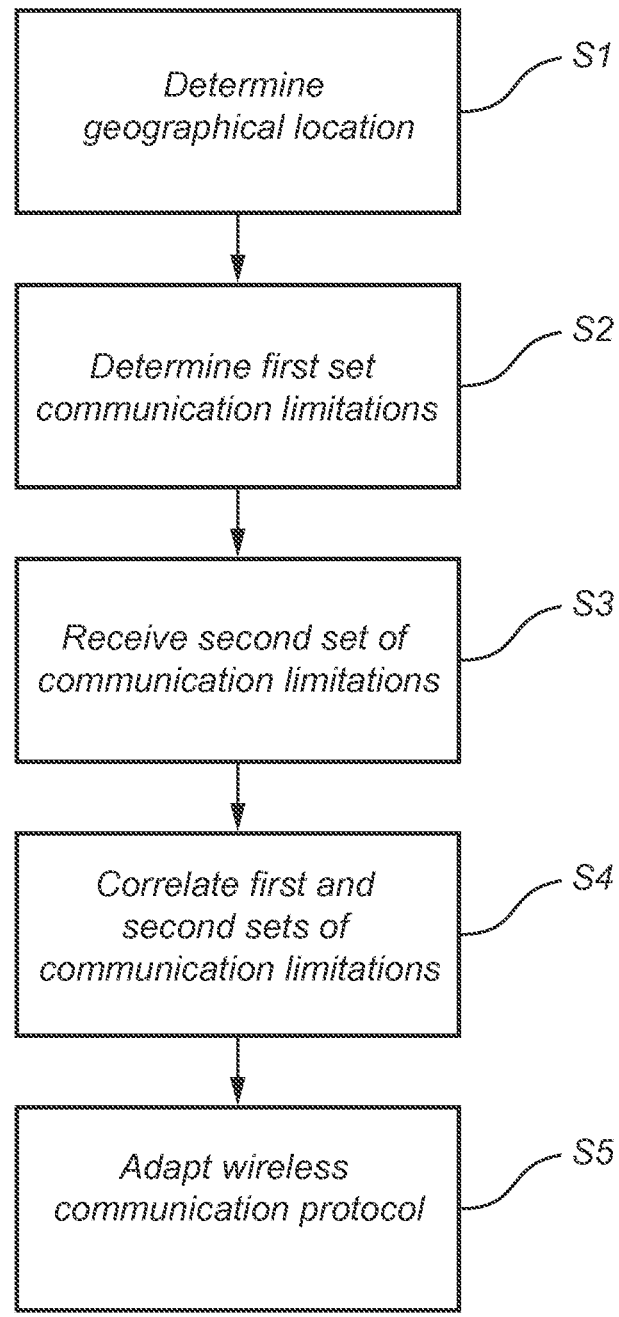
FIG. 2 is a flow chart illustrating the operational steps for adapting the wireless communication protocol applied in accordance to the disclosure.
Figure 3:
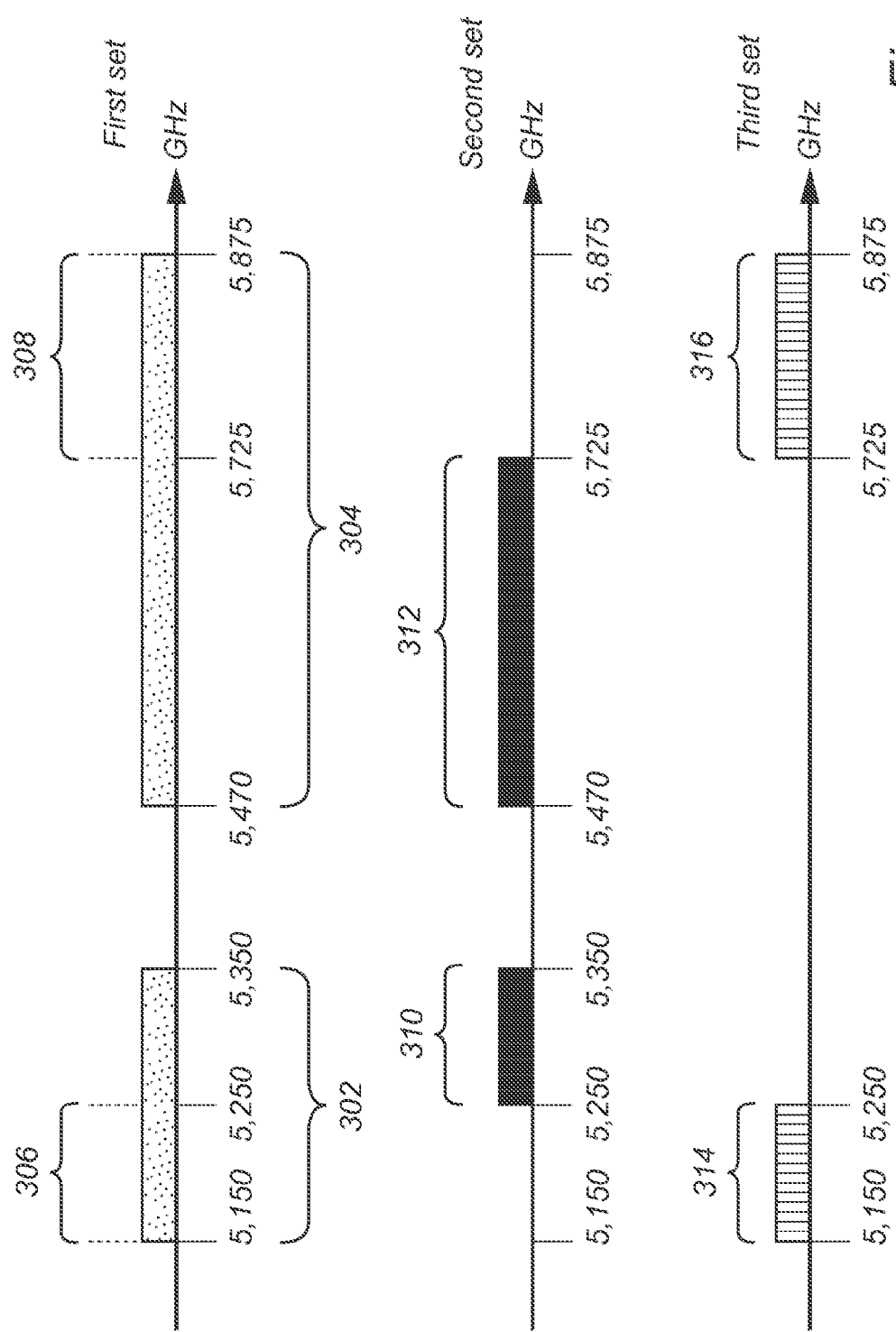
FIG. 3 is a diagram graphically illustrating the correlation between the first and the second set of communication limitations.

Turning now to FIGS. 2 and 3 in conjunction, disclosing the operation of the concept for correlating local regulations relating to wireless communication with requirements set by the at least one of the entertainment, architectural, commercial, industrial, street and event industries.

As discussed above, wireless data communication within the GHz frequency spectrum generally may be defined as allowed within a frequency range between 5.150 GHz and 5.875 GHz. This overall frequency range has several limitations, and is typically limited to two distinct frequency ranges, the first frequency range 302 being from 5.150 GHz to 5.350 GHz and the second frequency range 304 being from 5.470 GHz to 5.875 GHz. Within these ranges, there is a plurality of local regulations in some way placing limitations to wireless data communications. For example, in the US there are limitations as to antenna requirements within a frequency range 306 being between 5.150 GHz to 5.250 GHz. Similarly, in Europe there are limitations to an emitted power within a frequency range 308 being between 5.725 GHz to 5.875 GHz. Thus, a complicated scenario being present for a person scheduled to configure a wireless communication system.

Thus, according to the disclosure, the process trying to mitigate these obstacles starts by determining, S1, a current location for performing the wireless communication. In the illustration provided in FIG. 3 and in relation to the above discussion, two exemplifying locations being Europe and the USA, where the wireless communication system may be used. Other locations are of course possible and within the scope of the disclosure.

Once the location has been determined, the local communication limitations as exemplified above will be determined, S2, which can take into account all local regulations set by the local governing bodies handling wireless data communication. Typically, the information may be stored in such a manner that it may be updated as needed in case of changes in the communication limitations. The information may thus in a possible embodiment be acquired from a remote location. However, the information may of course also be stored locally within a wireless communication device.

As discussed above, further information relating to the specific requirements set by at least one of the entertainment, architectural, commercial, industrial, street and event industry environment will further be received, S3, for example relating to requirements for radar detection which is an highly undesirable requirement for example cost wise for equipment used for the discussed specific purpose. In the illustrated embodiment shown in FIG. 3, two areas of radar detection are visualized, a first radar frequency range 310 between 5.250 GHz and 5.350 GHz and a second radar frequency range 312 between 5.470 GHz and 5.725 GHz.

In correlating, S4, the first and the second sets of communication limitations it may be seen that two distinct frequency ranges remains, a first resulting frequency range 314 between 5.150 GHz and 5.250 GHz, and a second resulting frequency range 316 between 5.725 GHz and 5.875 GHz. However, in further taking into account also the geographical location and the limitations discussed above, it can be seen that the first resulting frequency range 314 would be unsuitable for use in at least one of the entertainment, architectural, commercial, industrial, street and event industry environment in the US due to the antenna requirements set there (e.g. having a requirement for use of a fixed antenna within the frequency range between 5.150 GHz and 5.250 GHz). Similarly, the second resulting frequency range 316 unsuitable for use in at least one of the entertainment, architectural, commercial, industrial, street and event industry environment in Europe due to the power output limitations set there, severely limiting the range of the communication equipment.

Accordingly, taking in all of the above, the wireless communication protocol applied by the wireless communication system 100 may be adapted, S5, to secure that the wireless communication fully stayed within the limitations set by the current environment and location for communication. In the present example, this will generally mean that the first resulting frequency range 314 will be used for communication within Europe and the second resulting frequency range 316 will be used for communication in the US. In addition and in an example embodiment of the disclosure, the resulting frequency range (e.g. 314/316) can be subdivided into a plurality of (in comparison to general Wi-Fi equipment) smaller communication channels, typically having a bandwidth below 5 MHz and preferably between 3-5 MHz.

In summary, the present disclosure relates to a method configured to adapt a wireless communication protocol used by a wireless communication device configured for wireless control within at least one of the entertainment, architectural, commercial, industrial, street and event industries, the wireless communication device being configured for wireless communication within a radio spectrum comprising frequency bands within the 5 GHz range, the method comprising determining a geographical location for performing the wireless communication, determining a first set of pre-regulated communication limitations relating to the radio spectrum within the 5 GHz range at the determined geographical location, receiving a second set of communication limitations being specific for the at least one of the entertainment, architectural, commercial, industrial, street and event industries, correlating the first set of communication limitations with the second set of communication limitations resulting in a third set of communication limitation, and adapting the wireless communication protocol of the wireless communication device to correspond to the limitations set by the third set of communication limitations.

Advantages with the disclosure includes allowing for a simplified set-up for a user handling for example a wireless communication system comprising a plurality of such wireless communication devices and to secure that the wireless communication fully stayed within the limitations set by the third set of communication limitations.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the disclosure has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed disclosure, from a study of the drawings, the disclosure, and the appended claims. The person skilled in the art realizes that the present disclosure is not limited to the described embodiments.

What is claimed is:

1. A method configured to adapt a wireless communication protocol used by a wireless communication device configured for wireless control within at least one of the entertainment, architectural, commercial, industrial, street and event industries, the wireless communication device being configured for wireless communication within a radio spectrum comprising frequency bands within the 5 GHz range, the method comprising:
determining a geographical location for performing the wireless communication;
determining a first set of pre-regulated communication limitations relating to the radio spectrum within the 5 GHz range at the determined geographical location;

receiving a second set of communication limitations being specific for the at least one of the entertainment, architectural, commercial, industrial, street and event industries;

correlating the first set of communication limitations with the second set of communication limitations resulting in a third set of communication limitation; and adapting the wireless communication protocol of the wireless communication device to correspond to the limitations set by the third set of communication limitations.

2. The method according to claim 1, wherein the second set of communication limitations comprises a predefined bandwidth for channels for the wireless control provided by the wireless communication device.

3. The method according to claim 2, wherein the predefined bandwidth is below 5 MHz.

4. The method according to claim 2, wherein the predefined bandwidth is between 3-5 MHz.

5. The method according to claim 1, wherein the second set of communication limitations comprises exclusion of a bandwidth range requiring radar detection.

6. The method according to claim 5, wherein the bandwidth range requiring radar detection is between 5.260 GHZ and 5.725 GHz.

7. The method according to claim 1, wherein the wireless communication protocol is configured to provide wireless control using at least one of a DMX512 protocol, a DMX512A protocol, a RDM protocol, an ACN protocol, an ArtNet protocol, a sACN protocol, a KNX protocol, a DALI protocol and/or a DSI protocol.

8. The method according to claim 1, wherein the wireless communication device is further configured for wireless communication within a radio spectrum comprising frequency bands within the 2.4 GHz range.

9. The method according to claim 8, wherein the first set of communication limitations further comprises pre-regulated communication limitations relating to the radio spectrum within the 2.4 GHz range.

10. The method according to claim 1, wherein the first set of pre-regulated communication limitations relating to the radio spectrum within the 5 GHz range differs for different geographical locations.

11. A wireless communication device configured to provide wireless communication using an adaptable wireless communication protocol configured for wireless control within at least one of the entertainment, architectural, commercial, industrial, street and event industries, wherein the wireless communication device comprises:

an antenna;

a wireless communication module connected to the antenna; and a control unit for controlling the operation of the wireless communication module, wherein the wireless communication device is configured for wireless communication within a radio spectrum comprising frequency bands within the 5 GHz range, the wireless communication device is configured to provide wireless control using at least one of a DMX512 protocol, a DMX512A protocol, a RDM protocol, an ACN protocol, an ArtNet protocol, a sACN protocol, a KNX protocol, a DALI protocol and/or a DSI protocol, and the adaptable wireless communication protocol is adapted by:

determining a geographical location for performing the wireless communication;

determining a first set of pre-regulated communication limitations relating to the determined geographical location and the radio spectrum within the 5 GHz range;

receiving a second set of communication limitations being specific for the at least one of the entertainment, architectural, commercial, industrial, street and event industries; and correlating the first set of communication limitations with the second set of communication limitations resulting in a third set of communication limitation.

12. The wireless communication device according to claim 11, wherein the second set of communication limitations comprises a predefined bandwidth for channels for the wireless control provided by the wireless communication device.

13. The wireless communication device according to claim 12, wherein the predefined bandwidth is below 5 MHz.

14. The wireless communication device according to claim 12, wherein the predefined bandwidth is between 3-5 MHz.

15. The wireless communication device according to claim 11, wherein the second set of communication limitations comprises exclusion of a bandwidth range requiring radar detection.

16. The wireless communication device according to claim 11, further configured for wireless communication with a radio spectrum comprising frequency bands within the 2.4 GHz range.

17. A computer program product comprising a non-transitory computer readable medium having stored thereon instructions for controlling a wireless communication device configured to provide wireless communication using an adaptable wireless communication protocol configured for wireless control within at least one of the entertainment, architectural, commercial, industrial, street and event industries, wherein the wireless communication device is configured for wireless communication within a radio spectrum comprising frequency bands within the 5 GHz range, wherein the instructions, when executed by a computing device having one or more processors, cause the computing device to perform operations comprising:

receiving a geographical location for performing the wireless communication;

determining a first set of pre-regulated communication limitations relating to the determined geographical location and the radio spectrum within the 5 GHz range;

receiving a second set of communication limitations being specific for the at least one of the entertainment, architectural, commercial, industrial, street and event industries;

correlating the first set of communication limitations with the second set of communication limitations resulting in a third set of communication limitation; and adapting the adaptable wireless communication protocol of the wireless communication device to correspond to the limitations set by the third set of communication limitations.

* * * * *